US006836716B2

(12) United States Patent
Roelleke et al.

(10) Patent No.: US 6,836,716 B2
(45) Date of Patent: Dec. 28, 2004

(54) RESTRAINING SYSTEM COMPRISING A RESTRAINING DEVICE FOR PROTECTING AT LEAST ONE PASSENGER AND A METHOD FOR CONTROLLING A RESTRAINING SYSTEM

(75) Inventors: Michael Roelleke, Leonberg-Hoefingen (DE); Thomas Jauch, Nehren (DE); Armin Koehler, Sachsenheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/111,779
(22) PCT Filed: Jul. 4, 2001
(86) PCT No.: PCT/DE01/02467
§ 371 (c)(1),
(2), (4) Date: Jul. 31, 2002
(87) PCT Pub. No.: WO02/18179
PCT Pub. Date: Mar. 7, 2002

(65) Prior Publication Data
US 2003/0034194 A1 Feb. 20, 2003

(30) Foreign Application Priority Data
Aug. 29, 2000 (DE) .......................................... 100 42 376
(51) Int. Cl.$^7$ .............................................. B60R 21/01
(52) U.S. Cl. ........................... 701/45; 701/47; 180/271; 180/274; 180/281; 280/728.1; 280/735
(58) Field of Search ..................... 701/45, 47; 180/271, 180/274, 281; 280/728.1, 734, 735

(56) References Cited

U.S. PATENT DOCUMENTS

| 4,842,301 | A | * | 6/1989 | Feldmaier .................... 280/735 |
| 5,036,467 | A | | 7/1991 | Blackburn et al. |
| 5,065,322 | A | * | 11/1991 | Mazur et al. .................. 701/47 |
| 5,073,860 | A | * | 12/1991 | Blackburn et al. ............ 701/47 |
| 5,379,221 | A | * | 1/1995 | Schulter et al. ............... 701/47 |
| 5,667,244 | A | | 9/1997 | Ito et al. |
| 5,668,723 | A | * | 9/1997 | Blackburn .................... 701/45 |
| 5,790,404 | A | * | 8/1998 | Faye et al. .................... 701/45 |
| 5,814,897 | A | * | 9/1998 | Ito et al. ..................... 307/10.1 |

FOREIGN PATENT DOCUMENTS

| DE | 197 13 087 | 11/1997 |
| EP | 1 101 657 | 5/2001 |

* cited by examiner

Primary Examiner—William A. Cuchlinski, Jr.
Assistant Examiner—Eric M. Gibson
(74) Attorney, Agent, or Firm—Kenyon & Kenyon

(57) ABSTRACT

A restraint system having a restraint device for protecting at least one passenger and a method for controlling a restraint system. The system and method act so as to to transform using a wavelet transformation, a signal measured by an acceleration sensor into a frequency range and in order to determine from the transformed signal the optimal triggering time point for the restraint device. For this purpose, the wavelet-transformed signal, on the one hand, is used for determining features in order to determine a crash type, and, on the other hand, to determine the braking acceleration energy. If the braking acceleration energy lies above a preestablished threshold value and if the identified crash type requires a triggering of the restraint system, then the restraint system is triggered.

8 Claims, 2 Drawing Sheets

RESTRAINING SYSTEM COMPRISING A RESTRAINING DEVICE FOR PROTECTING AT LEAST ONE PASSENGER AND A METHOD FOR CONTROLLING A RESTRAINING SYSTEM

FIELD OF THE INVENTION

The present invention relates to a restraint system having a restraint device for protecting at least one passenger, and to a method for controlling a restraint system.

BACKGROUND INFORMATION

From the German Published Patent Application No. 197 13 087, a vehicle passenger restraint system is known which has an acceleration sensor for measuring the acceleration of the motor vehicle, an analog/digital converter for digitalizing the output signals of the acceleration sensor, a wavelet transformer for transforming the digital signals in order to generate wavelet coefficients, and a device for calculating the speed, an actuator for the restraint system being activated as soon as the change in speed and the wavelet coefficient each exceed preestablished threshold values.

The wavelet coefficient is calculated using a wavelet function which was generated from a master wavelet function using a scaling factor and a displacement parameter for the time shift.

SUMMARY OF THE INVENTION

In contrast, the restraint system according to the present invention having a restraint device for protecting at least one passenger, and the method according to the present invention for controlling a restraint system, have the advantage that as a result of distinguishing between crash types and by evaluating the braking acceleration energy, an optimal triggering time point is determined for the restraint system. As a result, the triggering of the restraint system is more situation-appropriate.

It is particularly advantageous that the crash types are determined on the basis of extracted features, using a comparison of records of learned and stored features. In this way, an unambiguous identification of the specific crash type is possible, so as to decide whether the restraint system should be triggered or not. Not every crash calls for the triggering of the restraint system. Among such are, for example, front-end crashes having a velocity of maximum 15 km/h or a rear-end crash. In addition, spurious signals are identified in this way and therefore advantageously do not lead to a triggering of the restraint device.

In addition, it is advantageous that between the learned features and the extracted features differences are calculated, and these differences are compared to a preestablished threshold value, so that an identification of a crash type only takes place when a threshold value is not exceeded. In other words, only then is the difference so small that one can speak of an identification of this feature.

It is also advantageous that the measure for the braking acceleration energy is also compared to a second threshold value, so that the triggering actually takes place only if the crash type requires a triggering and if the measure lies above the threshold value, so that a triggering is therefore necessary. Both conditions must therefore be fulfilled in order to generate a triggering. In this way, advantageously, spurious triggerings become less likely, and therefore triggering a restraint device becomes more reliable.

DETAILED DESCRIPTION

As a result of the increasing use of restraint systems such as airbags and belt tighteners in motor vehicles, it is of decisive importance to determine the time point at which restraint systems of this type should be triggered. In this context, the type of collision between vehicles or obstacles and the velocity with which it takes place are of decisive importance for the triggering time point.

Wavelets have been determined to be a popular and successful method in the area of signal analysis, the wavelet transformation finding application in varied areas. The wavelet transformation is a method for subdividing an input signal into so-called wavelets as its components and for reuniting the original input signal as a linear superimposition of the wavelets. The wavelet transformation is applied effectively for analyzing an unstable or inconstant state, for example, in a state transition. Acting as the base is a master wavelet function, using which a scaling transformation and a Fourier transformation are carried out. The master wavelet function is a quadratically integrable function, which is temporally localized, or it is a function in the time range, although the base must be that which is limited and that which, in a distance range, is rapidly dampened or weakened. In the wavelet transformation, the subdivision rate for the analysis can be freely selected. In comparison to the Fourier transformation, base functions such as wavelets that occupy several intervals both in the time as well as in the frequency range are better suited for irregularities. On the basis of the locality of the functions, even particularly steep edges of functions can be optimally depicted.

Presented according to the present invention are, therefore, a restraint system having a restraint device and a method for controlling a restraint system, the system operating using a wavelet transformation and determining features on the basis of the wavelet-transformed signals, comparing these features to stored and learned features, in order to determine a crash type, on the basis of the transformed wavelet signal, determining the acceleration energy or at least a measure for it, and, on the basis of the crash type and of the measure for the acceleration energy, deciding whether the restraint device of the restraint system should be triggered or not.

Figure 1:
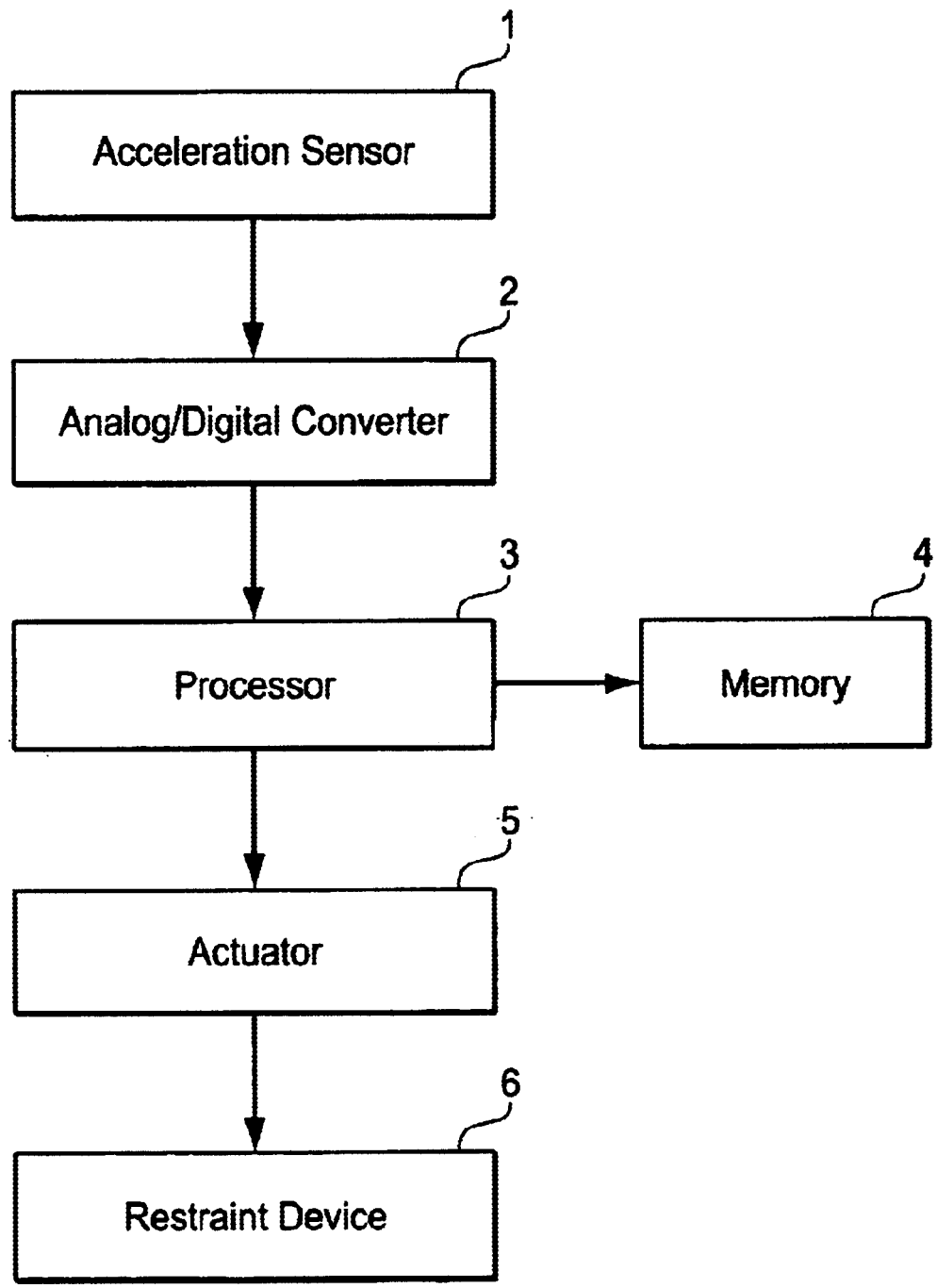
FIG. 1 depicts as a block diagram the restraint system according to the present invention.

In FIG. 1, the restraint system according to the present invention is depicted as a block diagram. An acceleration sensor 1 is connected to an input of an analog/digital converter 2. The data output of analog/digital converter 2 leads to a data input of a processor 3. Processor 3 is connected via a data input/output to a memory 4. A data output of processor 3 leads to an actuator 5, whose output in turn is connected to restraint device 6.

Acceleration sensor 1 measures the acceleration of the vehicle in which the restraint system according to the present invention is located. Acceleration sensor 1 is arranged at a specific location in the vehicle, for example, in a central section, so that acceleration sensor 1 outputs a signal as a function of an acceleration or a deceleration, as a negative acceleration. Different sensor types can be used for acceleration sensor 1, such as a sensor of a mechanical construction, which uses a mass rotor, a sensor that is made of a semiconductor, semiconductor sensors preferably having membranes, and a sensor can be used which, in the event that a vehicle collision occurs, only outputs a signal in case the deceleration of the vehicle attains the value which corresponds to a collision force greater than a preestablished measure. A forward acceleration and a deceleration as the output signals of acceleration sensor 1 can easily be distinguished on the basis of a plus or minus sign. The output signal of acceleration sensor 1 then leads to the input of analog/digital converter 2, which digitizes these output signals and then feeds them to processor 3. Processor 3 controls actuator 5, which has a firing control circuit, to trigger restraint system 6, if called for. Processor 3 is a conventional processor, for example, a microcontroller, which uses memory 4, on the one hand, to store intermediate results and, on the other hand, to use the stored data to make a crash type identification. Processor 3 also carries out the wavelet transformation of the data measured by acceleration sensor 1. The wavelet transformation has the advantage that a signal can be subdivided into its frequency components at a constant relative bandwidth without loss of time information. The wavelet transformation is especially suitable for non-steady signals and is provided with very rapid algorithms, which can be realized using filter bank structures. For this purpose, hardware can be used that is provided only for this purpose.

Mathematically, the wavelet transformation can be described as an integral transformation of the signal into orthogonal subspaces. The wavelet coefficients calculated in this context are essentially determined by two parameters. One is the scaling factor, the other is the time displacement. In addition, in the wavelet transformation, a function is used in accordance with which the signal is transformed, and this function is especially dependent on these two parameters, the scaling factor and the time displacement.

If the wavelet transformation is applied to crash acceleration signals, information can be extracted as a result concerning the maximum signal energies as well as concerning average signal energies in different frequency bands of the signal. These are characteristic information bits for the individual crash type and in combination they can be used for classifying or recognizing these crash types. Therefore, two features are present per frequency band. Using these features, it is then possible to identify the individual crash types. Here, seven different crash types are distinguished, for each crash type a record of stored and learned features being available. The features determined by acceleration sensor 1 are compared with these stored features, differences in this context between the measured and the stored features being calculated, i.e., energy differences being calculated. These differences must lie below a preestablished threshold value in order to identify a crash type. In other words, all the features of a record for a crash must have a difference below this first threshold value. Only then is the specific crash type identified. The crash types are created so that an identification is always made possible, at least one crash type representing a non-triggering-event, i.e., crash types which do not result in the triggering of restraint device 6.

The following table, the seven different crash types are depicted. Alternatively, it is possible that more or fewer crash types can be provided for.

| No. | Designation | Description |
| --- | --- | --- |
| 1 | SEVERE | Very fast crashes against a hard barrier (e.g., 50 km/h frontal) |
| 2 | LIGHT | Hard crashes of moderate speed (e.g., 20–30 km/h frontal) |
| 3 | OHARD | Hard, relatively fast offset and other non-frontal crashes (e.g., 55 km/h offset 50% left, 48 km/h pole collision 100%, 65 km/h ODB 40% right) |
| 4 | OSOFT | Soft offset and other non-frontal crashes of fast to moderate speed (e.g., 60 km/h ODB ADAC 40% left, 25 km/h 30° diagonal right) |
| 5 | NON | Non-triggering crashes (e.g., 15 km/h frontal and damage types) |
| 6 | MIS | Misuse tests (non-triggering) |
| 7 | REAR-END | Rear-end crashes (non-triggering) |

Processor 3, in addition to classifying the crash on the basis of the measured features, also carries out the calculation of the braking acceleration energy and compares this braking acceleration energy to a second preestablished threshold value, it being necessary that the braking acceleration energy lie above this threshold in order to be able to transmit a triggering signal for restraint device 6. The threshold value is specific for the detected crash type, and there are as many threshold values as there are crash types that result in the triggering of the restraint system.

This condition for the braking acceleration energy is therefore only checked if a specifically identified crash type results in the consequence that a triggering signal is transmitted for restraint device 6. In crash types 1 through 4, a triggering signal is transmitted, whereas in crash types 5 through 7, it is omitted. Therefore, if the braking acceleration energy lies above the threshold value and one of crash types 5 through 7 is identified, then no triggering signal results for restraint device 6, because one of the conditions has not been fulfilled. Rather, both conditions must be fulfilled in order to give a triggering signal for restraint device 6. If a triggering signal of this type is detected by processor 3 as one to be transmitted, then processor 3 transmits this fact to actuator 5, which then triggers restraint device 6 using a control signal.

Figure 2:
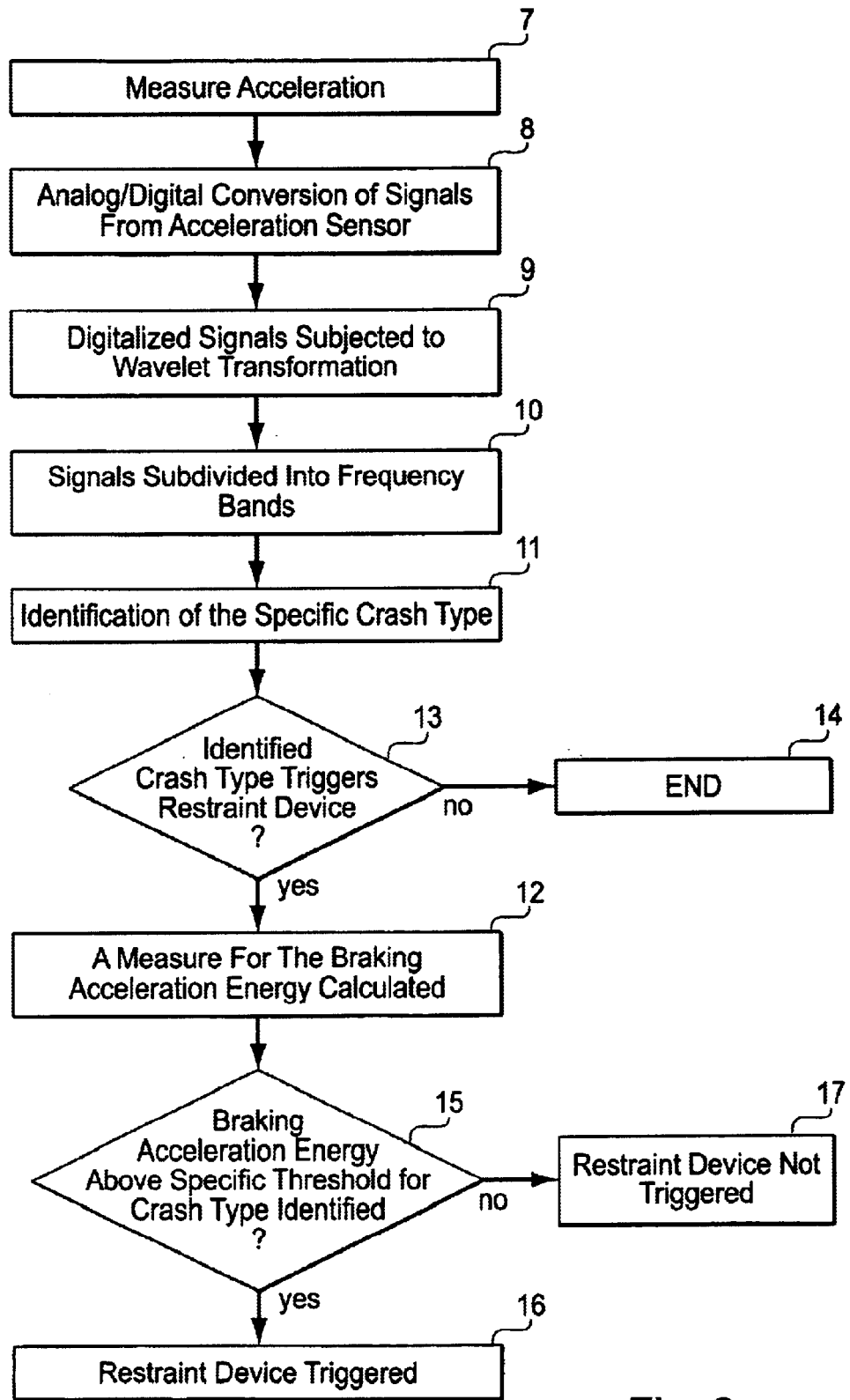
FIG. 2 depicts as a flow chart the method according to the present invention for controlling a restraint system.

In FIG. 2, the method according to the present invention for controlling a restraint system is depicted as a flow chart. In method step 7, the acceleration of the vehicle is measured by acceleration sensor 1. In method step 8, the analog/digital conversion of the signals generated by acceleration sensor 1 takes place. In method step 9, the digitalized signals are subjected to the wavelet transformation to transform them into the frequency space. In method step 10, the signals are subdivided into frequency bands, and for each frequency band the average and the maximum signal energies are calculated. In method step 11, an identification of the specific crash type is carried out on the basis of the average and the maximum signal energies per frequency band, as the extracted features, and on the basis of the stored features, which are stored as records in each case for the preestablished crash types. This identification, as was mentioned above, is carried out by calculating the difference between the measured features and the stored features. In method step 13, a check test is carried out as to whether the identified crash type has the consequence of triggering restraint device 6. If such is not the case, then in method step 14 the method according to the present invention is terminated.

After method step 13, in method step 12, a measure for the braking acceleration energy is calculated from the same wavelet transformed signals, the low-frequency portion of the signal energy being especially considered. In method step 15, this measure for the braking acceleration energy is compared with a preestablished threshold value which is characteristic for the crash type detected in method step 11. If the braking acceleration energy lies above the specific threshold value and if a crash type is detected which results in the triggering of restraint device 6, then in method step 16 restraint device 6 is triggered by actuator 5, because at method step 16 only those crash types arrive which result in the triggering of restraint device 6. Therefore, the AND-operation takes place here. If in method step 15 it was determined that the braking acceleration energy lies below the preestablished threshold value, then in method step 17, restraint device 6 is not triggered.

What is claimed is:

1. A restraint system, comprising:

a restraint device for protecting at least one passenger;

an acceleration sensor for measuring an acceleration of a vehicle;

an analog/digital converter for converting an output signal of the acceleration sensor into a digital signal corresponding to the acceleration;

a processor for performing a wavelet transformation of the digital signal into a frequency signal;

a memory; and an actuator for controlling the restraint device, wherein:
the processor subdivides the frequency signal into individual frequency ranges,
the processor for each frequency range measures a specific maximum signal energy and a specific average signal energy in order to extract a feature,
the processor determines a crash type on the basis of the extracted feature,
the processor determines from the frequency signal a measure for a braking acceleration energy, and
the processor as a function of the measure and of the determined crash type, transmits a control signal to the actuator.

2. The restraint system according to claim 1, wherein:
the processor compares the extracted feature to a feature that is learned and stored in the memory in order to determine the crash type, the learned feature being subdivided into records, and crash types being assigned in each case to the records.

3. The restraint system according to claim 2, wherein:
the processor calculates a difference between the extracted feature and the records of the learned feature, and
if the difference of one of the records lies beneath a first threshold value, the processor assigns the extracted feature to the crash type corresponding to the record lying beneath the first threshold value.

4. The restraint system according to claim 3, wherein:
the processor compares the measure to a second threshold value that is changeable over time, and
if the measure lies above the second threshold value, the processor transmits to the actuator the control signal as a function of the determined crash type.

5. A method for controlling a restraint system comprising:

measuring an acceleration of a vehicle as an acceleration signal;

digitizing the acceleration signal into a digital signal;

transforming the digital signal in accordance with a wavelet transformation into a frequency signal;

causing an actuator to control the restraint system;

subdividing the frequency signal into frequency ranges;

determining a specific maximum signal energy and a specific average signal energy for each frequency range in order to extract a feature;

determining a crash type on the basis of the extracted feature;

determining a measure for a braking acceleration energy from the frequency signal; and transmitting a control signal to the actuator as a function of the measure and of the determined crash type.

6. The method according to claim 5, further comprising:

causing a processor to compare the extracted feature to a stored feature in order to determine the crash type, the stored feature being subdivided into records, and specific crash types being assigned to the records.

7. The method according to claim 6, further comprising:

causing the processor to calculate a difference between the extracted feature and the records of the stored feature; and if the difference for one of the records lies below a first threshold value, causing the processor to assign the extracted feature to the crash type corresponding to the record lying beneath the first threshold value.

8. The method according to claim 5, further comprising:

causing the processor to compare the measure to a second threshold value; and if the measure lies above the second threshold value, causing the processor to transmit a triggering signal to the actuator.

* * * * *